J. SZCZUREK.
AIR OPENER FOR DOORS.
APPLICATION FILED NOV. 25, 1919.
1,338,882.
Patented May 4, 1920.
2 SHEETS—SHEET 1.
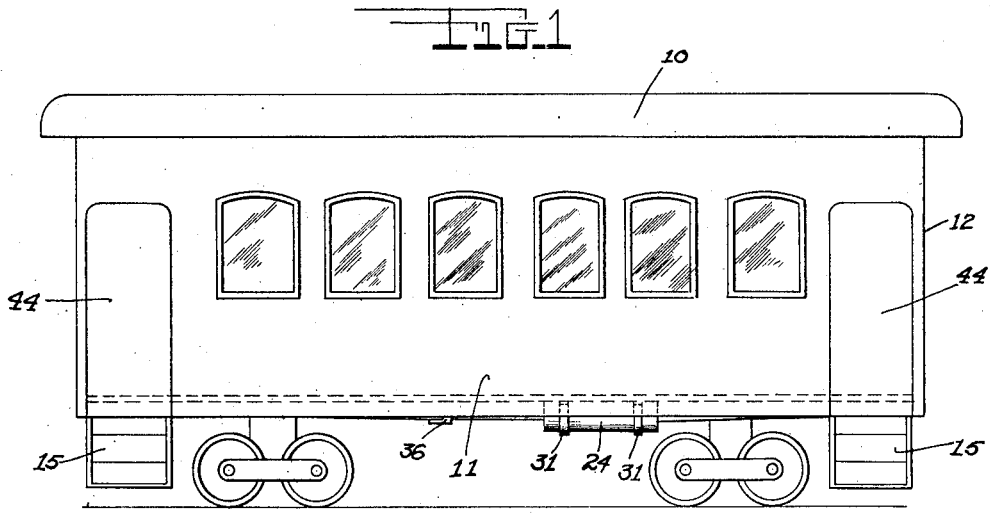
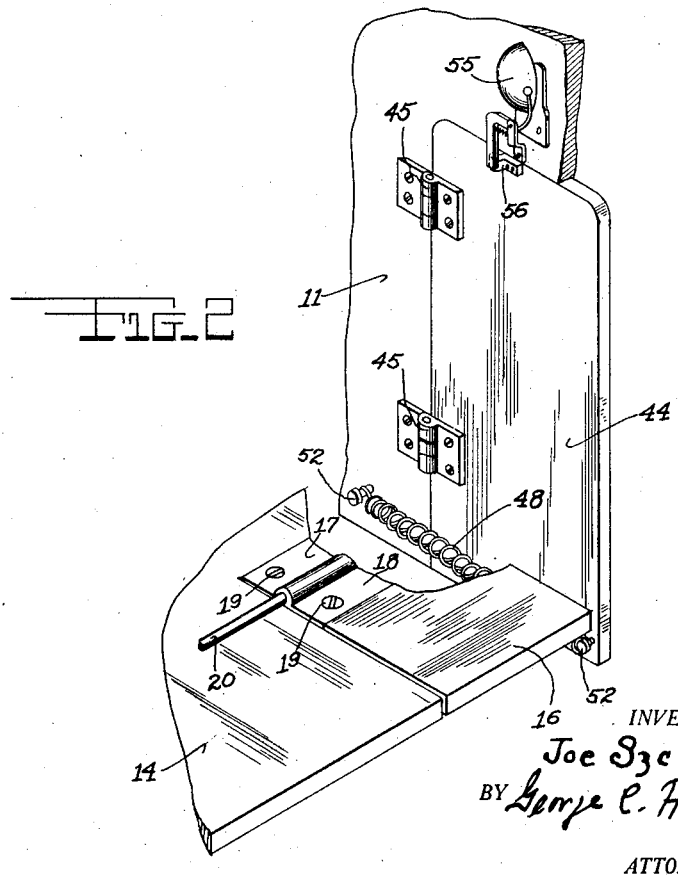
INVENTOR.
Joe Szczurek
BY George C. Heinicke
ATTORNEY.

J. SZCZUREK.
AIR OPENER FOR DOORS.
APPLICATION FILED NOV. 25, 1919.
1,338,882.
Patented May 4, 1920.
2 SHEETS—SHEET 2.
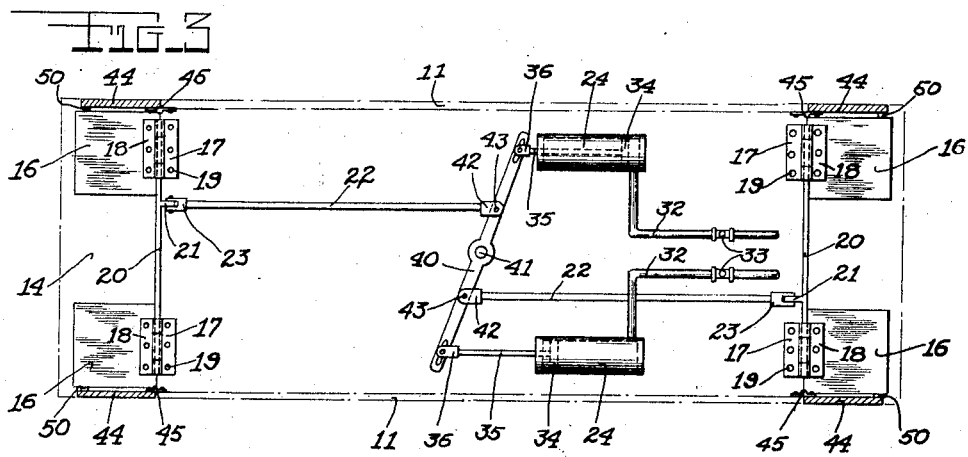
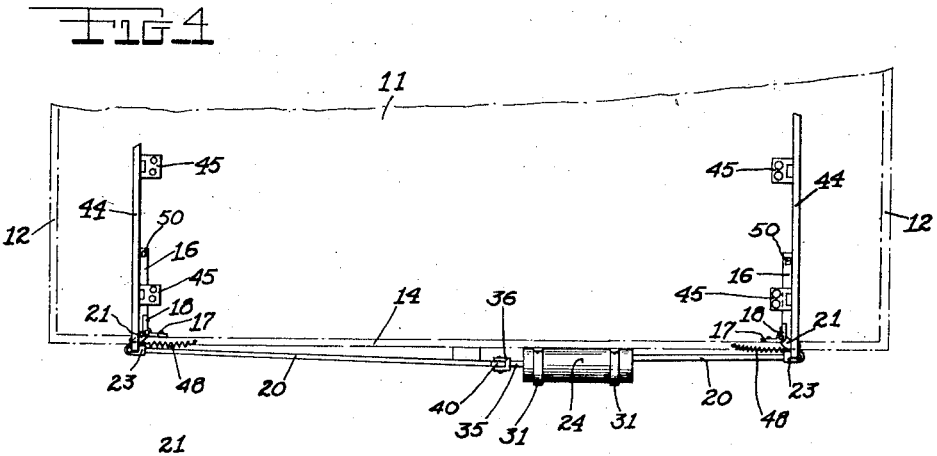
INVENTOR.
Joe Szczurek
BY George C. Hinmon
ATTORNEY.

UNITED STATES PATENT OFFICE.

JOE SZCZUREK, OF CHICAGO, ILLINOIS.

AIR-OPENER FOR DOORS.

1,338,882. Specification of Letters Patent. Patented May 4, 1920.

Application filed November 25, 1919. Serial No. 340,508.

*To all whom it may concern:*

Be it known that I, JOE SZCZUREK, a citizen of Poland, residing at Chicago, county of Cook, and State of Illinois, have invented certain new and useful Improvements in an Air-Opener for Doors, of which the following is a specification.

The principal object of this invention is to provide a simple, efficient and practical mechanism for simultaneously opening and closing passenger car step covers by means of a lever system operated initially by compressed air.

Another object is in the provision made for automatically opening and closing the entrance doors.

These and other like objects are attained by the novel construction and combination of parts hereinafter described and shown in the accompanying drawings, forming a material part of this disclosure, and in which—

Figure 1 is a side elevational view of a passenger car showing the attachment of the invention.

Fig. 2 is a fragmental perspective interior view showing the side door closed and step cover in position.

Fig. 3 is a bottom plan view of the car showing the lever and air systems.

Fig. 4 is a partial side elevational view showing the side doors opened and step covers raised, and Fig. 5 is a fragmental perspective view showing the step cover and support in detail.

Referring to the drawings in detail, the numeral 10 designates a passenger car having sides 11 ends 12, and a bottom 14 to which are attached the steps 15. Step covers 16 are secured to the floor 14 by the hinge elements 17 and 18 attached by the screws 19 and operable by the rod 20, passing pivotally through the hinge element 17 and secured to the opposite hinge element 18, attached by the screws 19 to the step covers 16.

Downwardly extending crank elements 21, formed integrally with the rods 20 and passing through apertures in the car floor, are pivotally connected to the rods 22 by the forked heads 23.

The cylinders 24, secured to the underside of the car floor by the bolted clamp bands 31, are supplied with compressed air through the pipe 32, controlled by the foot operated valves 33 which project upwardly through the car floor into operative position.

The air for this purpose is derived from a compression unit not shown in the drawings.

Contained within the cylinders 24, are the pistons 34 and the piston rods 35 having secured upon their outer ends forked heads 36, pivotally mounted upon and moving with the slotted ends of the bar lever 40 pivoted at its center and secured to the car by the pivot bolt 41, located in a central position on the underside of the car bottom.

Forked ends 42, attached to the rods 22, are pivotally secured upon the bar lever 40 by the pins 43. The car doors 44 are connected to the car sides 11 by the hinges 45, swinging inwardly from the sides after the upward movement of the hinged step cover 16, by the pull of the tension springs 48, and drawn to an open position as shown in Fig. 4.

The step cover 16 has secured within its outer edge a roller 50 contactable with the inner side of the respective door 44, compelling, by a downward action, the closing of the door against the resistance of the spring 48, secured at the end of the car by the headed pins 52.

A stop 54 is provided for supporting and limiting the downward movement of the step cover 16. A signal bell 55, of the usual spring operated bell-crank lever type is secured to the car side and engages a catch 56, attached to the car door thereby operating the hammer of the bell 55 and sounding an alarm upon the opening and closing of the door.

In operation, a pair of foot operated air valves controlling the admission of compressed air to the cylinders operate at will the pistons contained therein, and by means of the pivoted rods and levers effect the opening and closing of the step covers and automatically the entrance doors, causing an alarm to be sounded by means of a spring operated bell of usual design.

Having thus described my invention, what I claim as new and desire to secure by Letters Patent, is—

1. In a device for operating step covers and doors, the combination with a pair of doors hung on vertical axes, a pair of opposed step covers, guide rollers set in the lateral edges of said covers adapted to contact with said doors to close them, a pair of air operated pistons, a centrally pivoted cross bar actuated by said pistons, and operative connections between the ends of said cross bar and said covers.

2. In mechanism for actuating car doors and step covers, the combination with a pair of cylinders disposed below the car floor, means for operating said cylinders by admitting fluid pressure to them, a centrally pivoted lever directly connected with the pistons of said cylinders, means normally holding said doors open, said step covers being hinged and carrying rollers adapted to close said doors when the covers are moved to horizontal position, and connections between the lever and the hinges of said step covers for operating said covers.

In testimony whereof I have affixed my signature.

JOE SZCZUREK.